US010558969B2

(12) United States Patent
Prakash et al.

(10) Patent No.: US 10,558,969 B2
(45) Date of Patent: Feb. 11, 2020

(54) MODIFIED CONFIRMATION ELEMENT DATA FOR TRANSACTION CONFIRMATION

(71) Applicant: Visa International Service Association, San Francisco, CA (US)

(72) Inventors: Gyan Prakash, Foster City, CA (US); Prakash Kalaiah, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 945 days.

(21) Appl. No.: 14/747,511

(22) Filed: Jun. 23, 2015

(65) Prior Publication Data

US 2015/0371229 A1    Dec. 24, 2015

Related U.S. Application Data

(60) Provisional application No. 62/015,964, filed on Jun. 23, 2014.

(51) Int. Cl.
*G06Q 40/00* (2012.01)
*G06Q 20/32* (2012.01)

(52) U.S. Cl.
CPC ................ *G06Q 20/3226* (2013.01)

(58) Field of Classification Search
USPC ............ 705/39, 38, 40, 37, 80, 41; 707/758; 235/379; 382/138
See application file for complete search history.

(56) References Cited

U.S. PATENT DOCUMENTS

| 6,678,664 | B1* | 1/2004 | Ganesan ................ G06Q 20/02 235/379 |
| 7,069,240 | B2 | 6/2006 | Spero et al. |
| 7,200,749 | B2* | 4/2007 | Wheeler ................ G06F 21/32 705/80 |
| 7,992,781 | B2 | 8/2011 | Hammad |
| 8,489,624 | B2* | 7/2013 | King ........................ G06K 9/00 707/758 |
| 8,650,124 | B2 | 2/2014 | Singh |
| 8,892,462 | B1 | 11/2014 | Borovsky |

(Continued)

OTHER PUBLICATIONS

D. Crocker, T. Hansen, M. Kucherawy, DomainKeys Identified Mail (DKIM) Signatures (RFC6376), Internet Society Requests for Comments. (Year: 2011).*

(Continued)

*Primary Examiner* — Tien C Nguyen
(74) *Attorney, Agent, or Firm* — Kilpatrick Townsend & Stockton LLP

(57) ABSTRACT

A transaction is conducted by a user. Confirmation element data and a corresponding confirmation element identifier are generated for the transaction. The confirmation element data and an authorization response message for the transaction are then associated by the confirmation element identifier. The confirmation element data and the confirmation element identifier are sent to a mobile device of the user. The user enters a user personal identifier at the mobile device, which generates modified confirmation element data comprising the user personal identifier. The modified confirmation element data is sent with the authorization response message to a processing entity.

19 Claims, 10 Drawing Sheets

(56) References Cited

U.S. PATENT DOCUMENTS

| | | | |
|---|---|---|---|
| 8,909,553 B2* | 12/2014 | Abifaker | G06Q 20/04 |
| | | | 705/41 |
| 2009/0125429 A1* | 5/2009 | Takayama | G06Q 20/04 |
| | | | 705/35 |
| 2011/0145148 A1 | 6/2011 | Hammad | |
| 2011/0161230 A1 | 6/2011 | Singh | |
| 2012/0078682 A1 | 3/2012 | Pinsley et al. | |
| 2012/0290609 A1 | 11/2012 | Britt | |
| 2013/0097078 A1 | 4/2013 | Wong | |
| 2014/0074631 A1 | 3/2014 | Grossman | |
| 2014/0112571 A1* | 4/2014 | Viera | G06Q 40/12 |
| | | | 382/138 |

OTHER PUBLICATIONS

R. Gellens, J. Klensin. Message Submission for Mail (RFC6409), Internet Society Requests for Comments. (Year: 2011).*

* cited by examiner

| PAN 902 | EXP. DATE 904 | SERVICE CODE 906 | CONFIRMATION ELEMENT IDENTIFIER 908 | CVV 910 | CONVERTED MODIFIED CONFIRMATION ELEMENT DATA 912 | AUTHORIZATION STATUS 914 | ADDITIONAL DATA 916 |

AUTHORIZATION RESPONSE MESSAGE 900

FIG. 9

MODIFIED CONFIRMATION ELEMENT DATA FOR TRANSACTION CONFIRMATION

CROSS-REFERENCES TO RELATED APPLICATIONS

This application is a non-provisional of and claims the benefit of priority to U.S. Provisional Application No. 62/015,964, filed Jun. 23, 2014, which is hereby incorporated by reference in its entirety for all purposes.

BACKGROUND

Traditionally, in-person transactions involve generation of physical copies of transaction information (e.g., receipts), and may require both a resource requesting user and a resource providing entity to maintain such physical copies. This becomes cumbersome when performing large numbers of transactions, in terms of both storage as well as the resources required to produce paper transaction receipts (e.g., paper, ink, printing devices, etc.).

Illustratively, a first party may wish to access a resource at a second party. The first party may provide some authentication data to the second party, and the second party may submit an authorization request message to an authorizing entity. The authorizing entity may then authorize access to the resource and may provide an indication of this in electronic form to the second party. The second party may then print out a paper copy of the authorization and may request that the first party sign or otherwise verify that it has agreed to any terms and/or conditions required by the authorizing entity as a condition to access the resource. The signed paper copy or duplicate thereof may then be retained by the first and second parties for further processing.

While the above-described transaction process can be used, a number of improvements could be made. For instance, the conventional process is inefficient as it requires the storage and use of paper copies of authorization documents.

Thus, new and enhanced methods for confirming access to resources are desired. Embodiments of the invention address these and other problems, individually and collectively.

BRIEF SUMMARY

Embodiments of the invention are directed to systems and methods related to generating and sending confirmation element data for a transaction to a user mobile device. In some embodiments, confirmation element data may be an electronic receipt.

One embodiment of the invention is directed to a method comprising a server computer that can receive an authorization request message for a transaction by a user from an access device. The server computer can send the authorization request message to an authorization computer and can receive an authorization response message from the authorization computer indicating authorization of the transaction. The server computer can then determine contact information for the user and can generate confirmation element data. The confirmation element data can include transaction data associated with the transaction and a confirmation element identifier.

Subsequently, the server computer can associate the confirmation element data and the authorization response message by the confirmation element identifier. In some embodiments, associating the confirmation element data and the authorization response message comprises including the confirmation element identifier in the authorization response message. The server computer can send the confirmation element data and the confirmation element identifier to a mobile device associated with the user from which the server computer can receive modified confirmation element data from the mobile device. In some cases, the confirmation element identifier can be sent as part of the confirmation element data to the mobile device. In some embodiments, the modified confirmation element data can be received in response to the user entering a user personal identifier into the mobile device. The modified confirmation element data can comprise the user personal identifier. In some cases, the user personal identifier can be an electronic signature or a biometric identifier of the user.

The server computer can determine the authorization response message associated with the modified confirmation element data by the confirmation element identifier and can send the modified confirmation element data and the authorization response message to the access device. In some embodiments, determining the authorization response message associated with the modified confirmation element data comprises retrieving the confirmation element identifier from the modified confirmation element data and determining that the authorization response message includes the confirmation element identifier. In some cases, the modified confirmation element data can be included in the authorization response message to the access device. In some implementations, the modified confirmation element data is converted to fit a standard of the authorization response message when being included in the authorization response message.

In some embodiments, the confirmation element data can indicate confirmation of the transaction from a resource providing entity. In some cases the resource providing entity can be a merchant or a resource owner that can enable the user to access a resource.

Another embodiment of the invention is directed to a server computer comprising a processor and computer-readable medium coupled to the processor, where the computer-readable medium comprises code, executable by the processor, for performing a method. The method comprises receiving, by the server computer, an authorization request message for a transaction by a user from an access device and sending the authorization request message to an authorization computer. The method further comprises receiving an authorization response message from the authorization computer indicating authorization of the transaction and determining contact information for the user. The method further comprises generating confirmation element data, which can include transaction data associated with the transaction and a confirmation element identifier.

The method further comprises associating, by the server computer, the confirmation element data and the authorization response message by the confirmation element identifier. The method further comprises sending the confirmation element data and the confirmation element identifier to a mobile device associated with the user from which the server computer can receive modified confirmation element data from the mobile device. The modified confirmation element data can comprise a user personal identifier. The method further comprises determining the authorization response message associated with the modified confirmation element data by the confirmation element identifier and sending the modified confirmation element data and the authorization response message to the access device. In some embodiments, the modified confirmation element data is included in the authorization response message sent to the access device.

Another embodiment of the invention is directed to a method comprising receiving, by an access device, user data for a transaction conducted by a user from a mobile device associated with the user. The method further comprises generating an authorization request message and sending the authorization request message to a server computer. The method further comprises receiving an authorization response message and modified confirmation element data. The modified confirmation element data can comprise a user personal identifier. In some embodiments, the confirmation element identifier is included in the authorization response message and the modified confirmation element data. In some implementations, the confirmation element identifier is included in the authorization response message and the modified confirmation element data, wherein the modified confirmation element data is converted to fit a standard of the authorization response message.

Another embodiment of the invention is directed to a method comprising sending, by a mobile device, user data for a transaction conducted by a user to an access device. The method further comprises receiving confirmation element data and an associated confirmation element identifier from a server computer, as well as a user personal identifier from the user. The method further comprises generating modified confirmation element data comprising the user personal identifier and sending the modified confirmation element data to the server computer. In some embodiments, the confirmation element identifier is received as part of the confirmation element data.

These and other embodiments of the invention are described in further detail below.

BRIEF DESCRIPTION OF THE DRAWINGS

FIG. 9 shows a data format for an exemplary authorization response message to be sent to an access device according to embodiments of the invention.

DETAILED DESCRIPTION

Figure 1:
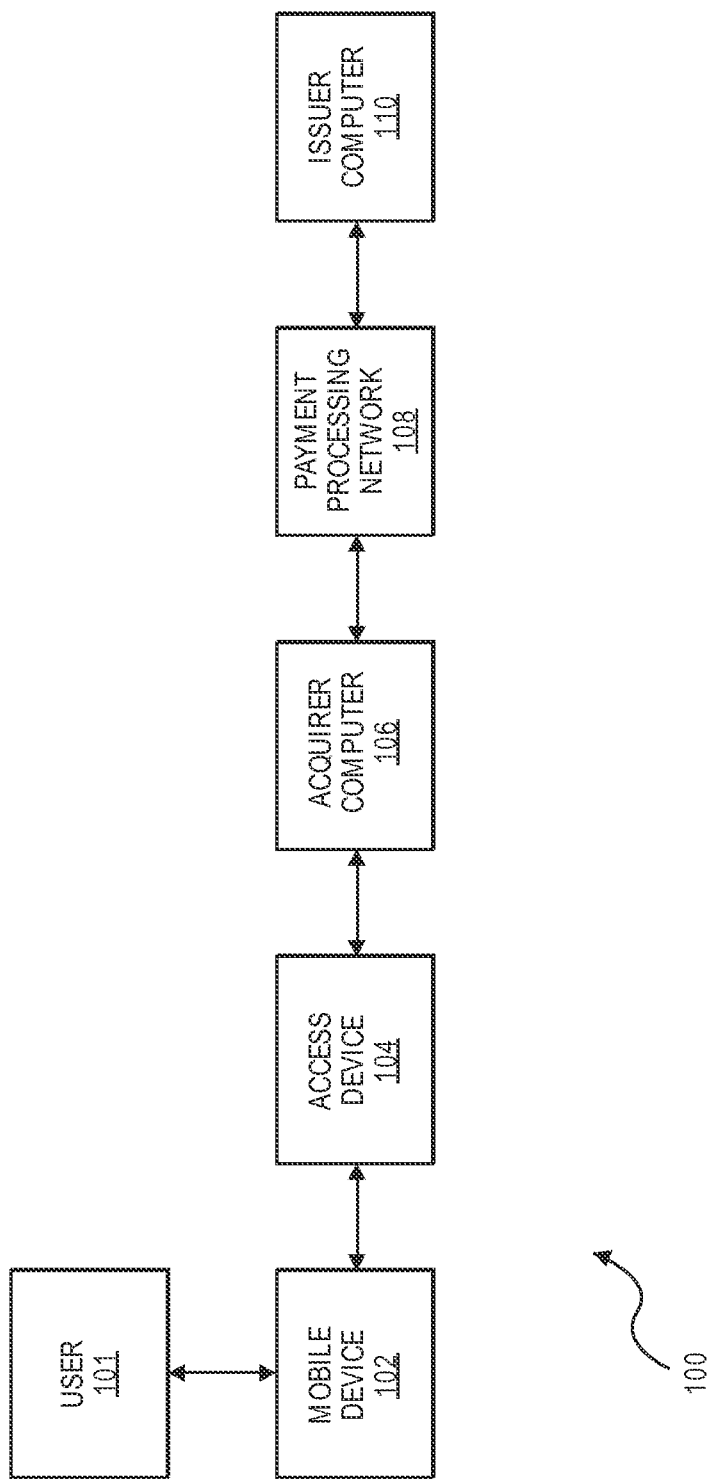
FIG. 1 shows a block diagram of an exemplary system according to embodiments of the invention.

Embodiments of the present invention are directed to systems, methods, apparatuses, and computer readable media for generating and sending confirmation element data for a transaction to a mobile device of a user. In some embodiments, confirmation element data may be an electronic receipt. Some embodiments of the invention do not require merchants to establish an infrastructure for generating and sending the confirmation element data and do not require the user to divulge personal data to merchants. Embodiments of the present invention may enable generating and sending confirmation element data to the user mobile device on behalf of a resource providing entity (e.g., a merchant), and using user data based on enrollment information or from a trusted source (e.g., an issuer of a payment account).

In one embodiment, a user can conduct a transaction at an access device, which may trigger an authorization request message to be sent to a server computer from the access device. An authorization computer (e.g., issuer computer) may receive the authorization request message and determine whether the transaction can be authorized. The authorization computer includes an authorization result indicating that the transaction is authorized in an authorization response message and sends the authorization response message to the server computer.

The server computer may then generate confirmation element data. The confirmation element data may include transaction data associated with the transaction and a confirmation element identifier. The server computer may associate the confirmation element data and the received authorization response message by the confirmation element identifier and then may send the confirmation element data and the confirmation element identifier to a mobile device associated with the user. In some cases, the confirmation element identifier is sent as part of the confirmation element data.

Subsequently, the server computer may receive modified confirmation element data from the mobile device. The modified confirmation element data may comprise a user personal identifier, which may be an electronic signature, a biometric identifier, or other identifier entered by the user. In some cases, the confirmation element identifier is received by the mobile device, and is then subsequently transmitted to the server computer by the mobile device (optionally with the confirmation element data), in response to the user acknowledging the confirmation element data by the mobile device. For example, the user may acknowledge the confirmation element data by activating an input element on the mobile device (e.g., pushing a button on a mobile phone that generates an electronic signature on an electronic receipt).

After the server computer receives the user personal identifier in the modified confirmation element data, the server computer may determine the authorization response message associated with the modified confirmation element data by the confirmation element identifier. The server computer may then send the modified confirmation element data and the authorization response message to the access device. In some cases, the modified confirmation element data may be included in the authorization response message that is sent to the access device. In some implementations, the modified confirmation element data is converted to fit within a pre-existing data field in a standard authorization response message, such as an ISO 8583 type message.

In some embodiments, the confirmation element data may indicate confirmation of the transaction between a resource providing entity and a user wishing to access a resource provided by the resource providing entity. In some cases, the resource providing entity may be a document owner that may enable the user to access a document, or it may be a merchant that can provide a resource, such as a good or service.

Prior to discussing embodiments of the invention, description of some terms may be helpful in understanding embodiments of the invention.

An "authorization request message" may be an electronic message that is sent to a payment processing network and/or an issuer of a payment account to request authorization for a payment transaction. An authorization request message according to some embodiments may comply with ISO 8583, which is a standard for systems that exchange electronic transaction information associated with a payment made by a consumer using a payment device or a payment account. An authorization request message may also comprise additional data elements corresponding to "identification information" including, for example, a service code, a CVV (card verification value), a dCVV (dynamic card verification value), an expiration date, etc. An authorization request message may also comprise "transaction data," such as any information associated with a current transaction (e.g., the transaction amount, merchant identifier, merchant location, etc.) as well as any other information that may be utilized in determining whether to identify and/or authorize a payment transaction.

An "authorization response message" may be an electronic message reply to an authorization request message generated by an issuing financial institution (i.e. issuer) or a payment processing network. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant. In some embodiments, the authorization response message may be associated with confirmation element data by a confirmation element identifier. In some cases, modified confirmation element data may be included in the authorization response message sent to an access device.

A "server computer" may typically be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer, or an issuer.

An "authorization computer" can include any system involved in authorization of a transaction. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource (e.g., an electronic document).

A "user personal identifier" may include any series of characters, numbers, graphics, symbols, or other information that may be provided by a user. Typically, a user personal identifier is utilized to uniquely identify the user during authentication or authorization processes that deal with sensitive data. For instance, an electronic signature or biometric identifier (e.g., fingerprint, voiceprint, facial images, iris scans, etc.) may be examples of user personal identifiers that can uniquely identify a user. A user personal identifier may increase security of a transaction since it can be utilized to confirm a user's identity before distribution of services or resources.

"User data" may refer to any information surrounding a user conducting a transaction. User data may include a name, contact information, and a location associated with the user. In some embodiments, user data may include payment account details (e.g., account identifier, card data, etc.) associated with the user. In some embodiments, user data may be stored at a mobile device of the user and by other entities, such as a payment processing network.

"Contact information" may refer to any information that can be utilized to communicate with a user. For example, contact information may include an email address, a phone number, or other information. In some embodiments, contact information may serve as an alias identifier for a user.

"Transaction data" may refer to any data or information surrounding or related to a transaction. For example, transaction data may include transaction details and any data associated with the transaction that may be utilized by entities involved in the transaction process. For instance, the transaction data may include information useful for processing and/or verifying the transaction. Transaction data may also include any data or information surrounding or related to any participants partaking in or associated with the transaction. Example transaction data may include a transaction amount, transaction location, resources received (e.g., products, documents, etc.), information about the resources received (e.g., size, amount, type, etc.), resource providing entity data (e.g., merchant data, document owner data, etc.), user data, date and time of a transaction, payment method, and other relevant information.

"Confirmation element data" may refer to any data or information that indicates confirmation of a transaction. Confirmation element data may be electronically generated code or other data. Exemplary information included in confirmation element data may include transaction data, such as resource providing entity data, user data, transaction details, a confirmation element identifier, an authorization status, and other information. In some embodiments, confirmation element data may include data representing an electronic receipt that can be displayed to a user or other entity on a device. In some cases, confirmation element data may include information that can enable a user to confirm a financial transaction conducted with a resource providing entity (e.g., merchant). In other cases, confirmation element data may store information that can enable a user to confirm a non-financial transaction conducted to enable access to a resource (e.g., electronic or paper document, an article for loan, a location such as a museum or particular jurisdiction) from a resource providing entity.

A "confirmation element identifier" may be any suitable indicator that uniquely identifies confirmation element data for a transaction. The confirmation element identifier may also be characterized as a transaction identifier or receipt identifier. In some embodiments, the confirmation element identifier may comprise alphanumeric characters and may be generated electronically using any suitable algorithms and methods. In some cases, the confirmation element identifier may be utilized to associate confirmation element data and an authorization response message. In some embodiments, a confirmation element identifier may be a combination of data that can uniquely match confirmation element data to an authorization response message. For example, the confirmation element identifier may one or more of a transaction amount, a transaction time, user data, and other transaction data. Thus, a confirmation element identifier could be any value or combination of values that can help match a confirmation element to an authorization message for a transaction.

"Modified confirmation element data" may be confirmation element data that is updated to include user personal identifier information, which may be provided by user input. For instance, modified confirmation element data may comprise a user personal identifier that is entered by a user, and that is present with other information. In some embodiments, modified confirmation element data may comprise the user personal identifier in addition to confirmation element data. In other embodiments, modified confirmation element data may comprise confirmation element data that may be partially or fully altered (e.g., deleted, replaced, etc.) in order to include the user personal identifier. Exemplary modified confirmation element data can include an electronic receipt that is modified with an electronic signature that was input in a mobile device by the user. Modified confirmation element data may be in the form of electronically generated code or other data.

"A resource providing entity" may be an entity that may make resources available to a user. Examples of resource providing entities include merchants, vendors, suppliers, owners, traders, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., e-commerce websites, online companies, etc.). In some embodiments, resource providing entities may make available physical items (e.g., goods, products, etc.) to the user. In other embodiments, resource providing entities may make available digital resources (e.g., electronic documents, electronic files, etc.) to the user. In other embodiments, resource providing entities may manage access to certain resources by the user.

I. Exemplary Systems and Methods

FIG. 1 shows a block diagram of a system 100 according to an embodiment of the invention. The system 100 is for generating and sending electronic receipts for a transaction to a user mobile device. The system 100 includes a user 101. It also includes a mobile device 102 that is operated by the user 101, an access device 104, an acquirer computer 106, a payment processing network 108, and an issuer computer 110. The mobile device 102, the access device 104, the acquirer computer 106, the payment processing network 108, and the issuer computer 110 may be in operative communication with each other.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

User 101 (which may alternatively be referred to as a consumer) may operate mobile device 102. User 101 may communicate with other entities by entering information into mobile device 102. For example, user 101 may enter user data into an interface on mobile device 102, which can send the entered data over a communications network. In some embodiments, user 101 may provide a user personal identifier (e.g., electronic signature, biometric identifier, etc.) to mobile device 102.

Mobile device 102 may be in any suitable form. For example, a suitable mobile device 102 can be hand-held and compact so that it can fit into a consumer's pocket (e.g., pocket-sized). Mobile device 102 can include a processor, a memory, input devices, and output devices, operatively coupled to the processor. Some non-limiting examples of mobile device 102 may include mobile devices (e.g., cellular phones, keychain devices, personal digital assistants (PDAs), pagers, notebooks, laptops, notepads, wearable devices (e.g., smart watches, fitness bands, jewelry, etc.), automobiles with remote communication capabilities, personal computers, payment cards (e.g., smart cards, magnetic stripe cards, etc.), and the like. Mobile device 102 may be associated with a consumer or a user, such as user 101.

Figure 3:
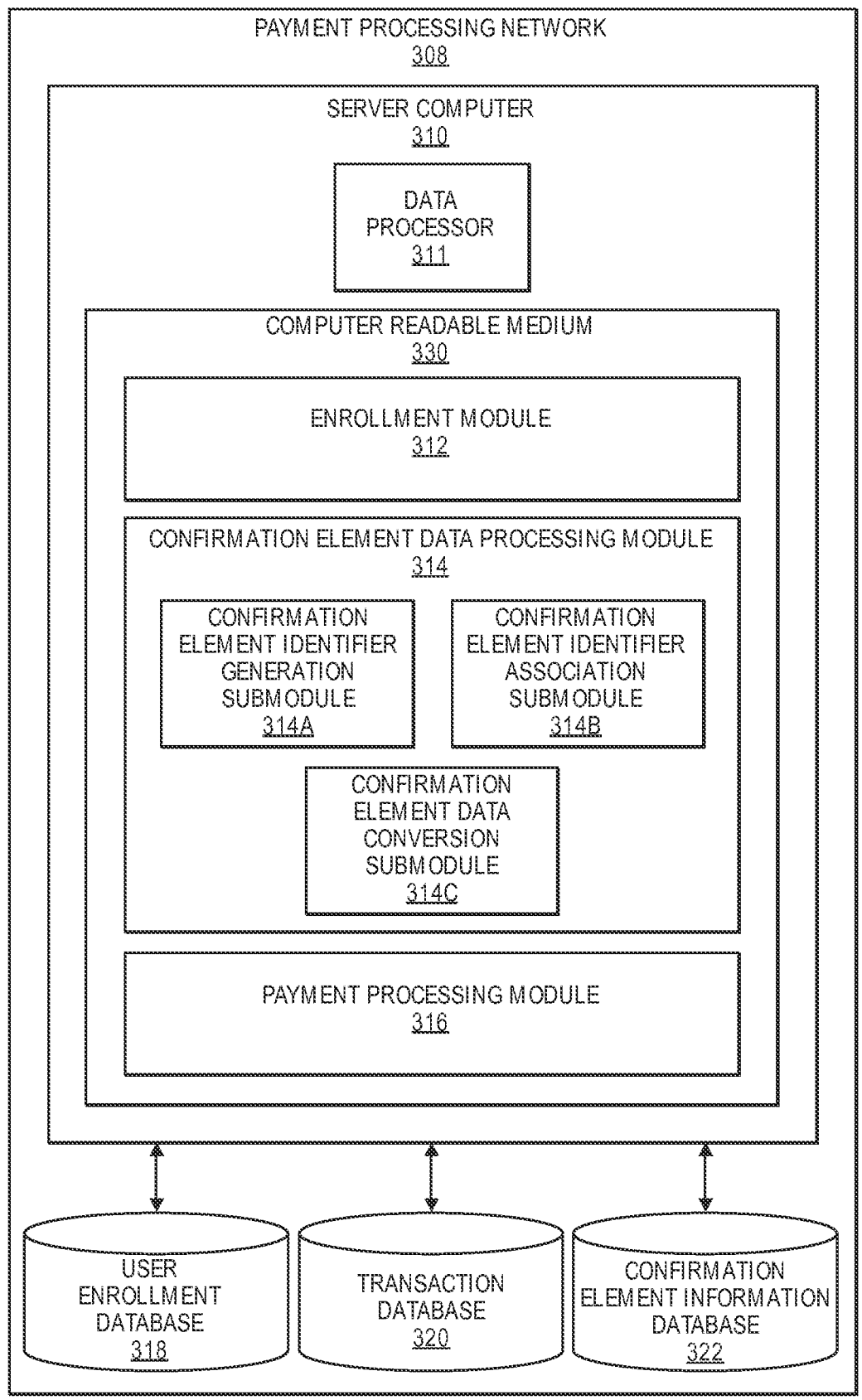
FIG. 3 shows a block diagram of some components that may be in an exemplary payment processing network according to embodiments of the invention.

In some embodiments, mobile device 102 may include a mobile application (e.g., payment application, wallet application, etc.) stored in a memory or secure element of mobile device 102. In other embodiments, the mobile application may be an interface on a merchant's website that allows a user to enter data (e.g., payment data) for submission for processing a transaction. FIG. 3 describes various components of an exemplary mobile device in further detail.

Access device 104 may be in any suitable form. In some embodiments, access device 104 can be a device that can interact with mobile device 102 during a purchase transaction or for other types of interactions (e.g., money, transfers, top-ups or to obtain account details, etc.). Access device 104 may be a merchant access device. Some non-limiting examples of access device 104 may include merchant devices, point of sale (POS) terminals or devices, cellular phones, PDAs, personal computers (PCs), tablet PCs, handheld specialized readers, set-top boxes, electronic cash registers, automated teller machines (ATMs), virtual cash registers, kiosks, security systems, access systems, and the like.

Access device 104 may include any suitable contact or contactless mode of operation to send or receive data from, or associated with, mobile device 102. For example, access device 104 can include RF (radio frequency) antennas, contact chip readers, magnetic stripe readers, or other means to interact with the mobile device 102. In some embodiments, access device 104 may be a merchant computer or other similar computing system associated with a merchant computer.

Acquirer computer 106 is typically a system for an entity (e.g. a bank) that has a business relationship with a particular merchant, a wallet provider, or other entity. Acquirer computer 106 may be communicatively coupled to a merchant computer and payment processing network 108 and may issue and manage an account of a merchant.

Payment processing network 108 may include data processing subsystems, networks, and operations used to support and deliver authorization services, and clearing and settlement services. For example, payment processing network 108 may comprise a server computer, coupled to a network interface, and a database of information. Payment processing network 108 may include wired or wireless network, including the internet. An example of payment processing network 108 includes VisaNet®, operated by Visa®. Payment processing networks such as VisaNet™ are able to process credit card transactions, debit card transactions, and other types of commercial transactions. VisaNet™, in particular, includes a VIP system (Visa Integrated Payments system), which processes authorization requests and a Base II system which performs clearing and settlement services.

Issuer computer 110 may be operated by an account issuer. Issuer computer 110 may also be known as an authorization computer. Typically, the issuer is a business entity (e.g. a bank) which maintains financial accounts (e.g., credit card account, checking account, savings account, merchant account, prepaid account, etc.) for the consumer and often issues a payment device, such as a credit, debit, prepaid, or other card, to the cardholder. Some entities can perform both issuer computer and acquirer computer functions. Embodiments of the invention encompass such single entity issuer-acquirers. Issuer computer 110 may be an example of an authorization computer and may determine whether a transaction can be authorized.

The computing devices described herein (e.g., mobile device 102, access device 104, acquirer computer 106, payment processing network 108, issuer computer 110, etc.) may each include a processor and a computer readable medium coupled to the processor, the computer readable medium comprising code, executable by the processor.

In embodiments of the present invention, a server computer can be a powerful computer or a cluster of computers. For example, a server computer can be a large mainframe, a minicomputer cluster, or a group of servers functioning as a unit. In one example, a server computer may be a database server coupled to a Web server.

Figure 2:
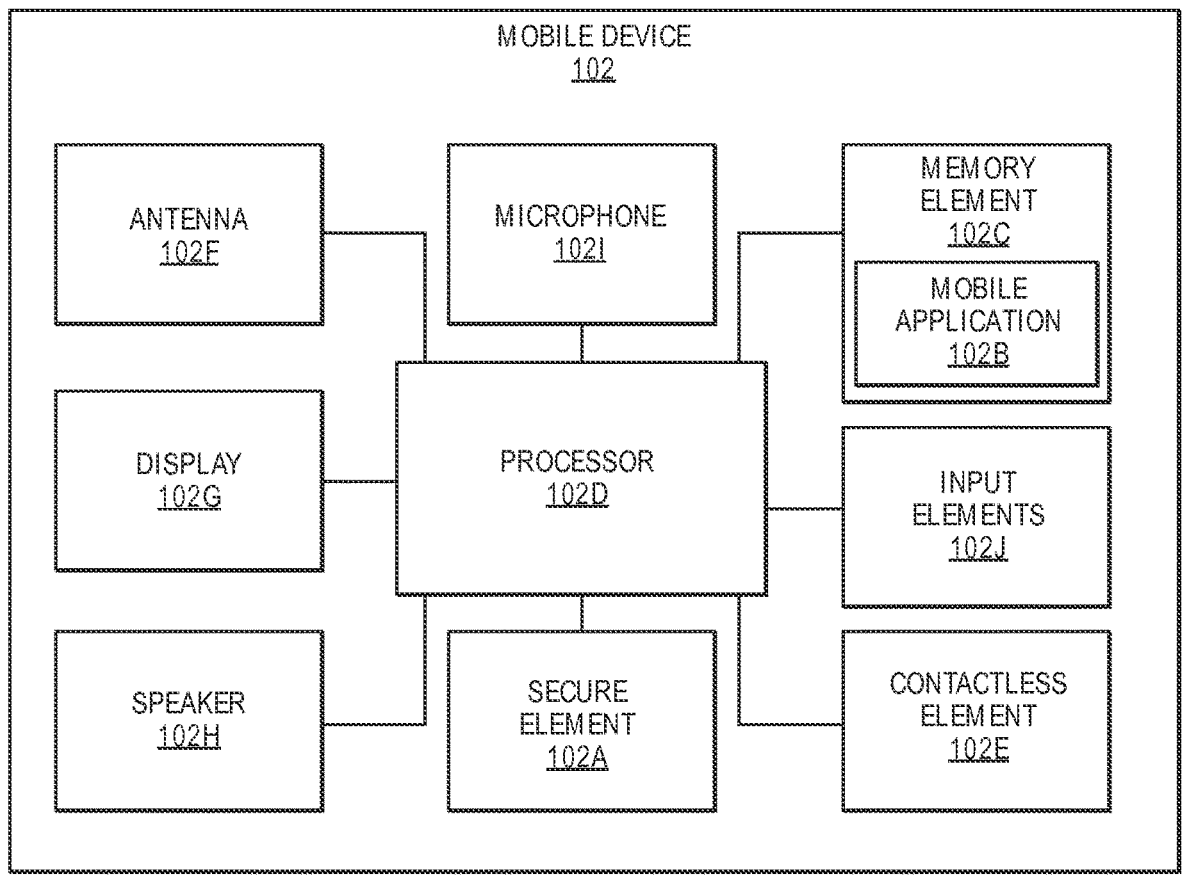
FIG. 2 shows a block diagram of an exemplary mobile device according to embodiments of the invention.

FIG. 2 depicts a block diagram of an exemplary mobile device 102. FIG. 2 shows a number of components, and mobile device 102 according to embodiments of the invention may comprise any suitable combination or subset of such components.

Mobile device 102 may include a processor 102D (e.g., a microprocessor) for processing functions of mobile device 102. One exemplary function enabled by processor 102D includes processing functions of display 102G to allow a consumer to see information (e.g., interfaces, contact information, messages, etc.). Processor 102D may include hardware within mobile device 102 that can carry out instructions embodied as code in a computer-readable medium.

An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Mobile device 102 may comprise a secure element 102A. Secure element 102A may be a secure memory on mobile device 102 such that the data contained on secure element 102A cannot easily be hacked, cracked, or obtained by an unauthorized entity. Secure element 102A may be utilized by mobile device 102 to host and store data and applications that may require a high degree of security. Secure element 102A may be provided to mobile device 102 by a secure element issuer. Secure element 102A may be either embedded in the handset of mobile device 102 or in a subscriber identity module (SIM) card that may be removable from mobile device 102. Secure element 102A can also be included in an add-on device such as a micro-Secure Digital (micro-SD) card or other portable storage device.

Secure element 102A may store any suitable sensitive information. For example, secure element 102A may store financial information, bank account information, account (e.g., credit, debit, prepaid) number information, payment tokens associated with such account number information, account balance information, expiration dates, and verification values (e.g., CVVs, dCVVs, etc.). Other information that may be stored in secure element 102A may include consumer information or user data (e.g., name, date of birth, contact information, etc.). In other embodiments, some, none, or all of the foregoing information may be stored in memory element 102C or may be stored at a remote server computer (e.g., in the cloud).

Mobile device 102 may comprise a memory element 102C (e.g., computer readable medium). Memory element 102C may be present within a body of mobile device 102 or may be detachable from the body of mobile device 102. The body of mobile device 102 may be in the form of a plastic substrate, housing, or other structure. Memory element 102C may store data (e.g., applications, etc.) and may be in any suitable form (e.g., a magnetic stripe, a memory chip, etc).

Memory element 102C may comprise a mobile application 102B. Mobile application 102B may be computer code or other data stored on a computer readable medium (e.g. memory element 102C or secure element 102A) that may be executable by processor 102D to complete a task (e.g., provide a service). Mobile application 102B may be an application that operates on mobile device 102 and that may provide a user interface for user interaction (e.g., to enter and view information).

In some cases, mobile application 102B may be a payment application. Mobile application 102B may communicate with a wallet provider server computer to retrieve and return information during processing of any of a number of services offered to the user via mobile device 102 (e.g., provisioning accounts to a wallet application stored on mobile device 102).

Mobile device 102 may further include a contactless element 102E, which may typically be implemented in the form of a semiconductor chip (or other data storage element) with an associated wireless transfer (e.g., data transmission) element, such as an antenna 102F. Contactless element 102E may be associated with (e.g., embedded within) mobile device 102. Data or control instructions transmitted via a cellular network may be applied to contactless element 102E by means of a contactless element interface (not shown). In some cases, the contactless element interface may function to permit the exchange of data and/or control instructions between the mobile device circuitry (and hence the cellular network) and an optional contactless element 102E.

Contactless element 102E may be capable of transferring and receiving data using a near-field communications (NFC) capability (or NFC medium) typically in accordance with a standardized protocol or data transfer mechanism (e.g., ISO 14443/NFC). Mobile device 102 may support contactless transactions using the EMV contactless communication protocol (EMV-CCP), which is based on ISO 14443, in order to interact with merchant access devices, such as access device 104. This capability may typically be met by implementing NFC. The NFC capability of mobile device 102 may be enabled by an embedded NFC chip or by the addition of an external memory card or accessory that contains the NFC chip. NFC capability is a short-range communications capability, such as RFID, Bluetooth®, infra-red, or other data transfer capability that can be used to exchange data between the mobile device 102 and an interrogation device. Thus, mobile device 102 may be capable of communicating and transferring data and/or control instructions via both cellular network and near-field communications capability.

Mobile device 102 may further include an antenna 102F for wireless data transfer (e.g., data transmission). Antenna 102F may be utilized by mobile device 102 to send and receive wireless communications. Antenna 102F may assist in connectivity to the Internet or other communications networks and enable data transfer functions. Antenna 102F may enable SMS, USSD, as well as other types of cellular communications, such as voice call and data communications.

Mobile device 102 may include a display 102G that may show information to a user. Display 102G may be any suitable screen that enables touch functionality. In some embodiments, display 102G of mobile device 102 may display a user interface (e.g., of a mobile application or website) that may allow the user to select and interact with objects presented on display 102G. The objects may include, but may not be limited to, menus, text fields, icons, and keys/inputs on a virtual keyboard. In some embodiments, display 102G may enable a user to manually provide an electronic signature to mobile device 102 by directly touching display 102G with their finger or suitable touch screen stylus pen.

Mobile device 102 may include a speaker 102H, which may be any suitable device that can produce sound in response to an electrical audio signal. Speaker 102H may play recorded sounds, as well as prerecorded messages to communicate with a user. In some cases, the user may be able to receive instructions by voice communications played by speaker 102H to which the user may respond (e.g., by returning voice command, activating input elements, etc.).

Mobile device 102 may include a microphone 102I, which may be any suitable device that can convert sound to an electrical signal. Microphone 102I may be utilized to capture one or more voice segments from a user. For example, microphone 102I may allow the user to transmit his or her voice to mobile device 102. In some embodiments, the user may utilize voice commands detected by microphone 102I to provide instructions to mobile device 102. In some cases, the user may provide voice commands detected by microphone 102I to navigate through mobile application 102B.

Mobile device 102 may further include input elements 102J to allow a consumer to input information into the device. Example input elements 102J include hardware and software buttons, audio detection devices (e,g., microphone), biometric readers, touch screens, and the like. A user may activate one or more of input elements 102J, which may pass user information (e.g., user personal identifier) to mobile device 102. In some cases, one or more of input elements 102J may be utilized to navigate through various screens of mobile application 102B.

In some embodiments, where mobile device 102 is a phone or other similar computing device, mobile device 102 may include a browser stored in the memory element 102C and may be configured to retrieve, present, and send data across a communications network (e.g., the Internet). In such embodiments, mobile device 102 may be configured to send data as part of a transaction. In some embodiments, mobile device 102 may provide the data upon request from another entity, such as access device 104.

FIG. 3 shows a block diagram of some components that may be in an exemplary payment processing network 308 according to embodiments of the invention. Payment processing network 308 includes a server computer 310 comprising a data processor 311 and a computer readable medium 330. The computer readable medium 330 may comprise a number of software modules including an enrollment module 312, a confirmation element data processing module 314 comprising a confirmation element identifier generation submodule 314A, confirmation element identifier association submodule 314B, and confirmation element data conversion submodule 314C, and payment processing module 316. Each module may comprise one or submodules, where each submodule may comprise one or more functions implemented by code, executable by data processor 311. Other modules and submodules may also reside on the computer readable medium 330. Examples of additional modules may include an authorization module for processing, and routing authorization request and response messages, a clearing and settlement module for processing and routing clearing messages, and performing settlement between parties, and data extraction (e.g., for retrieving data from external data sources such as databases) and message modification modules.

Payment processing network 308 may also comprise several databases, including user enrollment database 318, transaction database 320, and confirmation element information database 322. Each database may be a conventional, fault tolerant, relational, scalable, secure database such as those commercially available from Oracle™ or Sybase™.

Enrollment module 312 may enable, with the data processor 311, storing and retrieving user registration information. Registration information may also be referred to by any suitable name, such as registration data, enrollment information, and enrollment data. Enrollment module 312, in conjunction with the data processor 311, may prompt a user for enrollment information and receive the enrollment information from a mobile device associated with the user over a suitable communications network. The received information may be stored at payment processing network 308. In some embodiments, some or all of the received information may be stored at user enrollment database 318. Enrollment module 312, in conjunction with the data processor 311, may also manage integrity of enrollment information and update any newly received registration information as appropriate.

Enrollment module 312, in conjunction with the data processor 311, may also retrieve stored enrollment information associated with a user when the user conducts a transaction. If any information associated with the user is stored at user enrollment database 318, enrollment module 312 may comprise computer code for querying user enrollment database 318 with an identifier of the user (e.g., a name). Enrollment module 312 may also include computer code for providing the enrollment information to another entity, such as other modules in confirmation element data processing module 314 and payment processing module 316, as appropriate.

Confirmation element data processing module 314 may comprise code for enabling handling of the confirmation element data during a transaction. Confirmation element data processing module 314 may comprise one or more submodules, such as confirmation element identifier generation submodule 314A, confirmation element identifier association submodule 314B, and confirmation element data conversion submodule 314C.

Confirmation element identifier generation submodule 314A may comprise code for enabling the creation of a unique confirmation element identifier for each transaction. Confirmation element identifier generation submodule 314A may comprise code for utilizing any suitable algorithm and methods to generate confirmation element identifiers that may ensure a one-to-one mapping of confirmation element identifiers to confirmation element data for transactions. Confirmation element identifier generation submodule 314A may receive a request to generate a confirmation element identifier, generate a confirmation element identifier, and pass the generated confirmation element identifier to confirmation element identifier association submodule 314B.

Confirmation element identifier association submodule 314B may comprise code to enable association of confirmation element data and authorization response message corresponding to the same transaction. Confirmation element identifier association submodule 314B may comprise code to enable this association by using a confirmation element identifier received from confirmation element identifier generation submodule 314A. In some embodiments, confirmation element identifier association submodule 314B may store or have access to the confirmation element identifier in both the confirmation element data and the authorization response message. In other embodiments, confirmation element identifier association submodule 314B may store or have access to the confirmation element identifier in the confirmation element data and store or have access to a mapping of one or more confirmation element identifiers and one or more authorization response messages. In some embodiments, the mapping may be stored in the confirmation element information database 322. After an association is established, the confirmation element data and confirmation element identifier may be sent to a user's mobile device.

Confirmation element identifier association submodule 314B may also work in conjunction with the data processor 311 to enable retrieval of an authorization response message based on a confirmation element identifier. For example, payment processing network 308 may receive modified confirmation element data associated with a confirmation element identifier from the user's mobile device. Confirmation element identifier association submodule 314B may work in conjunction with the data processor 311 to detect the confirmation element identifier from the modified confirmation element data and utilize the confirmation element identifier to retrieve an authorization response message associated with the same transaction. Confirmation element identifier association submodule 314B may then work with the data processor 311 to pass the received modified confirmation element data and the authorization response message associated by the confirmation element identifier to confirmation element data conversion submodule 314C.

Confirmation element data conversion submodule 314C may work in conjunction with the data processor 311 to enable the modified confirmation element data to be included in an authorization response message. For example, in some cases, modified confirmation element data may not be able to be directly inserted into an authorization response message. Hence, confirmation element data conversion submodule 314C may work in conjunction with the data processor 311 to convert modified confirmation element data to be placed in a standard or non-standard data field of the authorization response message. In some embodiments, the conversion may involve altering modified confirmation element data to have a certain size, length, format, message type, or other features to enable the authorization response message to maintain its original format and user of its usual delivery channels.

Payment processing module 316 may enable typical payment transaction processing. Payment processing module 316 may enable receiving, processing, and sending authorization request messages and authorization response messages. In some embodiments, authorization response messages may be received from confirmation element data conversion submodule 314C. In some cases, payment processing module 316 may store any transaction data retrieved during transaction processing in transaction database 320.

User enrollment database 318 may store any information related to user registration. For example, enrollment database 318 may comprise registration data, including any suitable contact information, associated with each user. Additionally, enrollment module 312 may comprise any user preferences associated with each user as well. For example, user preferences may include information regarding whether a user chooses to receive confirmation element data by their mobile device. If so, further information regarding a delivery channel (e.g., text message, email message, mobile application notification, etc.) to receive the confirmation element data may be indicated in the user preferences. In some embodiments, information in user enrollment database 318 may be stored in any suitable storage mechanisms, such as one or more lookup tables.

Transaction database 320 may store any information related to a transaction. For example, transaction database 320 may include transaction data for each transaction processed by payment processing network 308. Exemplary transaction data may include a transaction amount, transaction location, resources received (e.g., products, documents, etc.), information about the resources received (e.g., size, amount, type, etc.), resource providing entity data (e.g., merchant data, document owner data, etc.), user data (e.g., name, associated card data, etc.), date and time of a transaction, payment method, and other relevant information. In some embodiments, the information in transaction database 320 may be organized in a suitable manner (e.g., by order in which transactions were conducted, user, merchant, location, transaction amount, etc.).

Confirmation element information database 322 may store any information related to confirmation element data. In some embodiments, confirmation element information database 322 may enable payment processing network 308 to manage confirmation element data for all processed transactions. Confirmation element data for various transactions may be organized in any suitable manner (e.g., by order in which transactions were conducted, user, merchant, location, transaction amount, confirmation element identifier, etc.). In some embodiments, confirmation element information database 322 may store modified confirmation element data comprising a user personal identifier in addition to or instead of confirmation element data. In some embodiments, confirmation element information database 322 may also store a mapping between confirmation element identifiers and authorization response messages associated by confirmation element identifiers.

Figure 4:
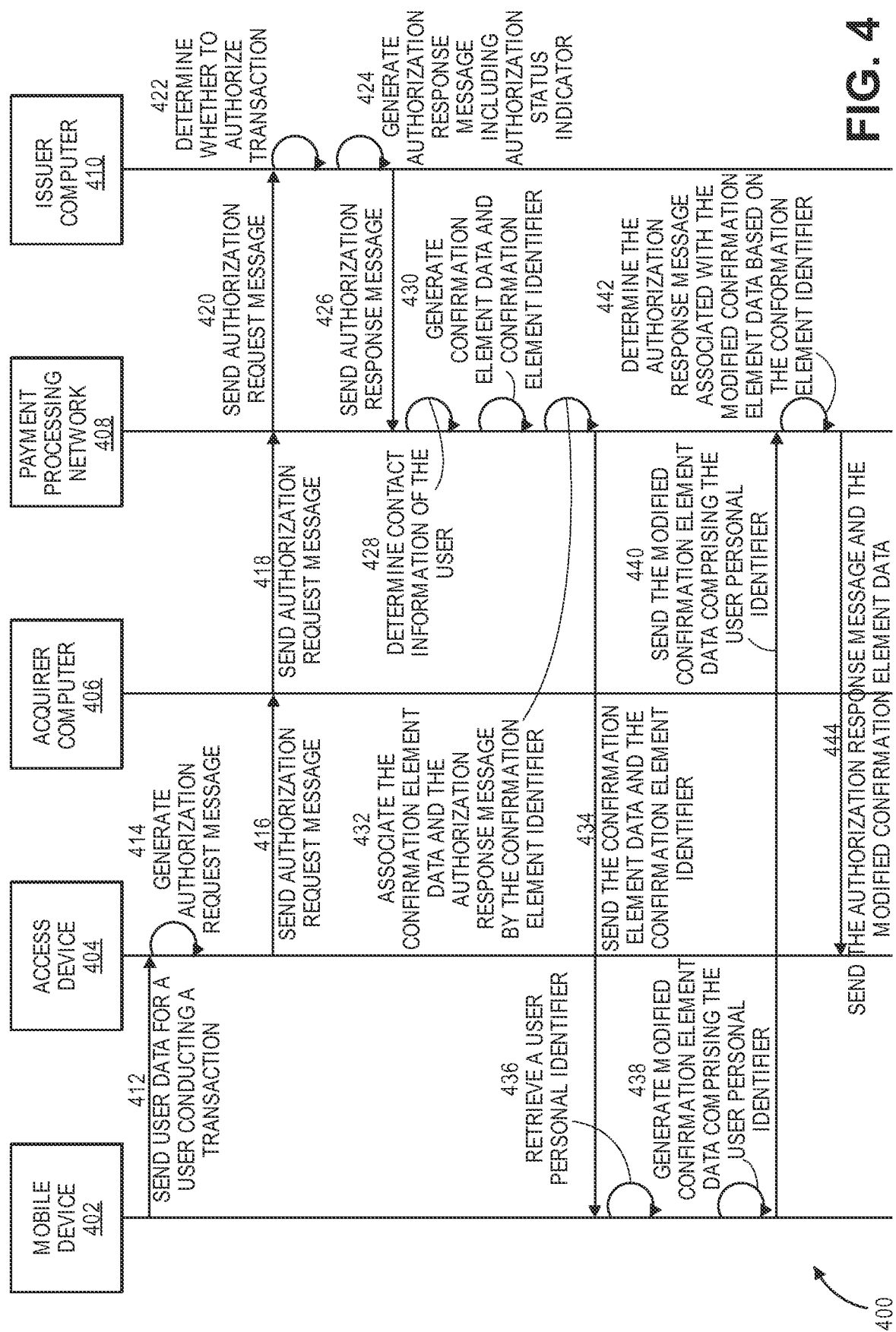
FIG. 4 shows an exemplary flow diagram according to embodiments of the invention.

FIG. 4 shows an exemplary flow diagram 400 according to embodiments of the invention. FIG. 4 includes a mobile device 402, an access device 404, an acquirer computer 406, a payment processing network 408, and an issuer computer 410. Entities included in FIG. 4 may have similar or different characteristics to entities in FIG. 1 and other figures described herein.

At step 412, mobile device 402 may send user data for a user conducting a transaction to access device 404. In some cases, the user may be user 101 as in FIG. 1, where user 101 operates mobile device 402. The user may go to access device 404 (e.g., a POS terminal, a merchant terminal, ATM, etc.) associated with a resource providing entity (e.g., merchant) to conduct the transaction. In some embodiments, the user may insert a payment device into access device 404 or pass a payment device in proximity to access device 404.

Access device 404 may read data from one of either a contact chip or a contactless element. The data read from the contact chip or the contactless element may include an account identifier (e.g., PAN), or any other data that may be used to identify a user account associated with the user. In some embodiments, the payment device may be mobile device 402.

At step 414, access device 404 may generate an authorization request message. In some embodiments, the authorization request message may include resource providing entity data, user data, and transaction data corresponding to the transaction.

At step 416, access device 104 may send the authorization request message to acquirer computer 406. The authorization request message may be sent over any suitable communications network. Acquirer computer 406 may be associated with a resource providing entity (e.g., merchant) that manages access device 404. The acquirer operating the acquirer computer 406 may have a relationship with the resource providing entity, such as via a financial account associated with the resource providing entity.

At step 418, acquirer computer 406 may send the received authorization request message to payment processing network 408. Payment processing network 408 may process the authorization request message before rerouting the message to issuer computer 410. The authorization request message may be sent over any suitable communications network.

At step 420, payment processing network 408 may transmit the received authorization request message to issuer computer 410. Issuer computer 410 may be an example of an authorization computer, and may be associated with a user account utilized by the user to conduct the transaction. The authorization request message may be sent over any suitable communications network.

At step 422, issuer computer 410 may receive the authorization request message and perform an authorization process. Issuer computer 410 may utilize information included in the authorization request message and other information that may be accessible to (e.g., stored at) issuer computer 410 to determine whether the transaction should be approved or declined. In some embodiments, issuer computer 410 may conduct a risk analysis based on information related to the user, the user account, and the transaction, in order to make an authorization decision. In some implementations, issuer computer 410 may include risk information (e.g., risk level, risk score, risk reasons, etc.) in the authorization response message instead of or in addition to the authorization decision. In other embodiments, the payment processing network 408 may perform the risk analysis.

At step 424, issuer computer 410 may generate an authorization response message including the authorization decision. The authorization decision may be an indication of whether the transaction was determined to be approved or declined in step 422. In some embodiments, the authorization response message may include merchant data, user data (e.g., payment account data), and transaction data for the transaction.

At step 426, issuer computer 410 may send the authorization response message to payment processing network 408. Payment processing network 408 may receive the authorization response message and determine whether issuer computer 410 authorized the transaction. If issuer computer 410 declined the transaction, the transaction may be cancelled. If issuer computer 410 approved the transaction, processing of the transaction may continue.

At step 428, payment processing network 408 may determine contact information of the user. Payment processing network 408 may utilize information (e.g., user data) identifying the user from the authorization response message to evaluate information about the user. For example, payment processing network 408 may access information, including contact information, stored at payment processing network 408 or issuer computer 410. The contact information may include a phone number, an email address, a mobile device identifier associated with mobile device 402, and other information. This may forgo the need for such information to be passed from mobile device 402 to access device 404.

In some embodiments, payment processing network 408 may determine whether the user has any profile data stored at payment processing network 408. In some cases, payment processing network 408 may evaluate enrollment data associated with the user stored at payment processing network 408 to determine whether the user has previously enrolled to receive electronic receipts. In other embodiments, payment processing network 408 may query issuer computer 410 for any profile data of the user and receive relevant information from issuer computer 410.

At step 430, payment processing network 408 may generate confirmation element data and a confirmation element identifier. In some embodiments, confirmation element data may be an electronic receipt for the transaction. In some cases, the transaction may be a financial transaction.

Confirmation element data may comprise information surrounding a transaction and any entities involved in the transaction (e.g., user data, transaction data, resource providing entity data, authorization status, etc.). In some embodiments, the confirmation element identifier may be included in the confirmation element data. Confirmation element data may be displayed on a display of mobile device 402 and may indicate to the user of information related to the conducted transaction. In some cases, some information included in confirmation element data may not be visible to the user.

The confirmation element identifier may be any suitable indicator that may uniquely identify the confirmation element data. The confirmation element identifier may also be characterized as a transaction identifier or a receipt identifier. The confirmation element identifier may be generated by payment processing network 408 by any suitable methods and algorithms that ensure the confirmation element identifier is unique. In some embodiments, confirmation element identifier may be utilized to associate the confirmation element data and the authorization response message for the transaction.

At step 432, payment processing network 408 may associate the confirmation element data and the authorization response message by the confirmation element identifier. This may ensure that payment processing network 408 may have enough information at a later time to determine that the confirmation element data and the authorization response message correspond to the same transaction. This association may be established in several ways.

In some embodiments, payment processing network 408 may include the confirmation element identifier in unique fields of the confirmation element data and the authorization response message. Hence, payment processing network 408 may determine that if the confirmation element identifier included in the confirmation element data and the confirmation element identifier in the authorization response message match, then the confirmation element data and the authorization response message correspond to the same transaction.

In other embodiments, payment processing network 408 may include the confirmation element identifier in the confirmation element data and may store a mapping between the confirmation element identifier and the authorization response message. For example, the mapping may be stored in a database at payment processing network 408. Any suitable mechanisms may be utilized to store the mapping, such as the use of one or more lookup tables. In some embodiments, a lookup table may comprise key-value pairs comprising confirmation element identifiers as keys, corresponding to authorization response messages.

Payment processing network 408 may utilize the mapping to retrieve an appropriate authorization response message. For example, payment processing network 408 may retrieve the confirmation element identifier from the confirmation element data and then utilize the retrieved confirmation element identifier when accessing the mapping. Payment processing network 408 may retrieve the authorization response message stored in association with the retrieved confirmation element identifier.

At step 434, payment processing network 408 may send the confirmation element data and the confirmation element identifier to mobile device 402. In some embodiments, the confirmation element data may include the confirmation element identifier. In other embodiments, the confirmation element data may be sent with the confirmation element identifier. The confirmation element data and the confirmation element identifier may be transmitted by any suitable methods (e.g., email message, text message, Short Message Service (SMS) service, mobile application notifications, etc.) using any appropriate communications means, such as the Internet or other communications network. In embodiments where the confirmation element data is received via a mobile application, the mobile application may be utilized to manage all confirmation element data received by mobile device 402.

At step 436, mobile device 402 may retrieve a user personal identifier entered by user 101. After receiving the confirmation element data, mobile device 402 may display the confirmation element data to user 101 and may prompt the user to enter a user personal identifier. Some examples of a user personal identifier may include an electronic signature, a biometric sample, a unique personal identification number (PIN) number, and other suitable indicator that may uniquely identify the user. In some embodiments, user 101 may be able to manually sign the confirmation element data using a user interface display of a touch screen device (e.g., touch screen mobile phone, tablet computer, or laptop computer). The entered user personal identifier may indicate that the user acknowledged information included in the confirmation element data.

In other embodiments, where the user may not be required to sign or electronically sign the confirmation element data, the user may acknowledge the delivery of the confirmation element data by other means. For example, the acknowledgement may be performed by the user by selecting an option on a menu of an interface (e.g., by activating one or more software or hardware buttons), performing a voice command, or via any other suitable means, which may trigger a message to be sent back from mobile device 402 to payment processor 408. However, it is preferred that the user enters a user personal identifier to acknowledge the confirmation element data as described above.

At step 438, mobile device 402 may generate modified confirmation element data comprising the user personal identifier. In some implementations, the modified confirmation element data may include some or all information included in the confirmation element data, in addition to the user personal identifier entered by user 101 in step 426. In some embodiments, further information that may be helpful for processing can be included in the modified confirmation element data (e.g., timestamp corresponding to when mobile device 402 received the confirmation element data, etc.).

At step 440, mobile device 402 may send the modified confirmation element data comprising the user personal identifier to payment processing network 408. The modified confirmation element data comprising the user personal identifier may be sent over any suitable communications network.

At step 442, payment processing network 408 may determine the authorization response message associated with the modified confirmation element data based on the confirmation element identifier. This method of determination may depend on the method of association of the confirmation element data and the authorization response message in step 432.

In some embodiments, the modified confirmation element data and the authorization response message may both include the confirmation element identifier. In this case, payment processing network 408 may retrieve the confirmation element identifier from the received modified confirmation element data and determine the authorization response message including a matching confirmation element identifier.

In other embodiments, the authorization response message may be stored in association with the confirmation element identifier in a database. In this case, payment processing network 408 may retrieve the confirmation element identifier from the received modified confirmation element data and access an entry in the table corresponding to the confirmation element identifier to retrieve the associated authorization response message.

In some embodiments, the confirmation element identifier may include specific characteristics of the transaction including the time of the transaction, the merchant, and the account number (or portion thereof) that was used to conduct the transaction. This information may be used to match and find the corresponding authorization response message.

At step 444, payment processing network 408 may send the authorization response message and the modified confirmation element data to access device 404. In some embodiments, payment processing network 408 may send the authorization response message and the modified confirmation element data to access device 404 via acquirer computer 406. The authorization response message and the modified confirmation element data may be sent over any suitable communications network.

Additionally or alternatively, the confirmation element data and the confirmation element identifier can be sent to the mobile device 402 (e.g., in a text message, e-mail, etc.) and the mobile device 402 (e.g., working in conjunction with an application on the mobile device), can store the confirmation element data (or modified confirmation element data).

In some embodiments, the modified confirmation element data may be included in the authorization response message, which may be sent to access device 404. For example, the modified confirmation element data may be converted to conform to standards of the authorization response message and then included in the authorization response message. In some cases, the modified confirmation element data may be converted to have one or more of a certain size, length, format, message type, or other features to enable inclusion in the authorization response message. In some embodiments, the modified confirmation element data may be included in a data field of the authorization response message. An exemplary authorization response message data format is described in FIG. 9.

In other embodiments, the modified confirmation element data may be sent in a separate message from the authorization response message, but may still be associated with the authorization message by the confirmation element identifier.

The authorization response message and the modified confirmation element data sent to access device 104 may indicate to the associated resource providing entity (e.g., merchant) that the transaction was successfully completed. In some embodiments, access device 104 may show an indication that the transaction was successfully completed on a display, which may be viewed by the user.

While the embodiments described in FIG. 4 may be utilized for a financial transaction, embodiments are not so limited. For example, embodiments may be utilized in other non-financial contexts, such as transactions enabling access to resources (e.g., documents, buildings, files, passwords, etc.) by a user. An example is described in FIG. 7 and FIG. 8.

Also, while specific steps are shown, it is understood that variations of the steps can be present in other embodiments of the invention. For example, in some embodiments, instead of generating and sending the confirmation element data and identifier to the mobile device 402 after receiving the authorization response message from the issuer computer 410, the payment processing network 408 can perform these steps right after receiving the authorization request message in step 418. Further, although FIG. 4 shows the payment processing network 408 performing various steps including steps 428, 430, 432, and 434, in other embodiments, a different entity (e.g., the acquirer computer 406) may perform such steps.

Figure 5:
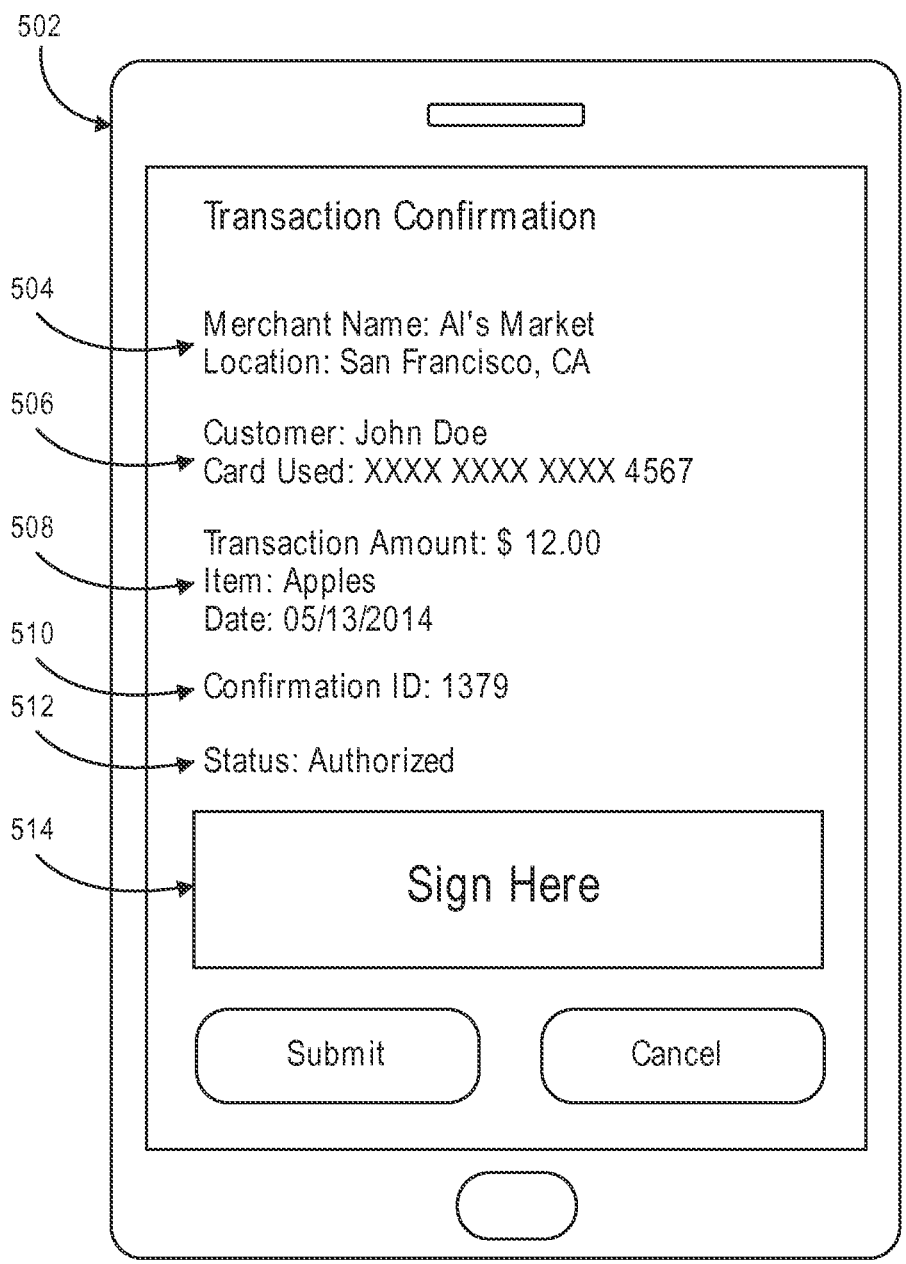
FIG. 5 shows a mobile device displaying exemplary confirmation element data according to embodiments of the invention.
Figure 6:
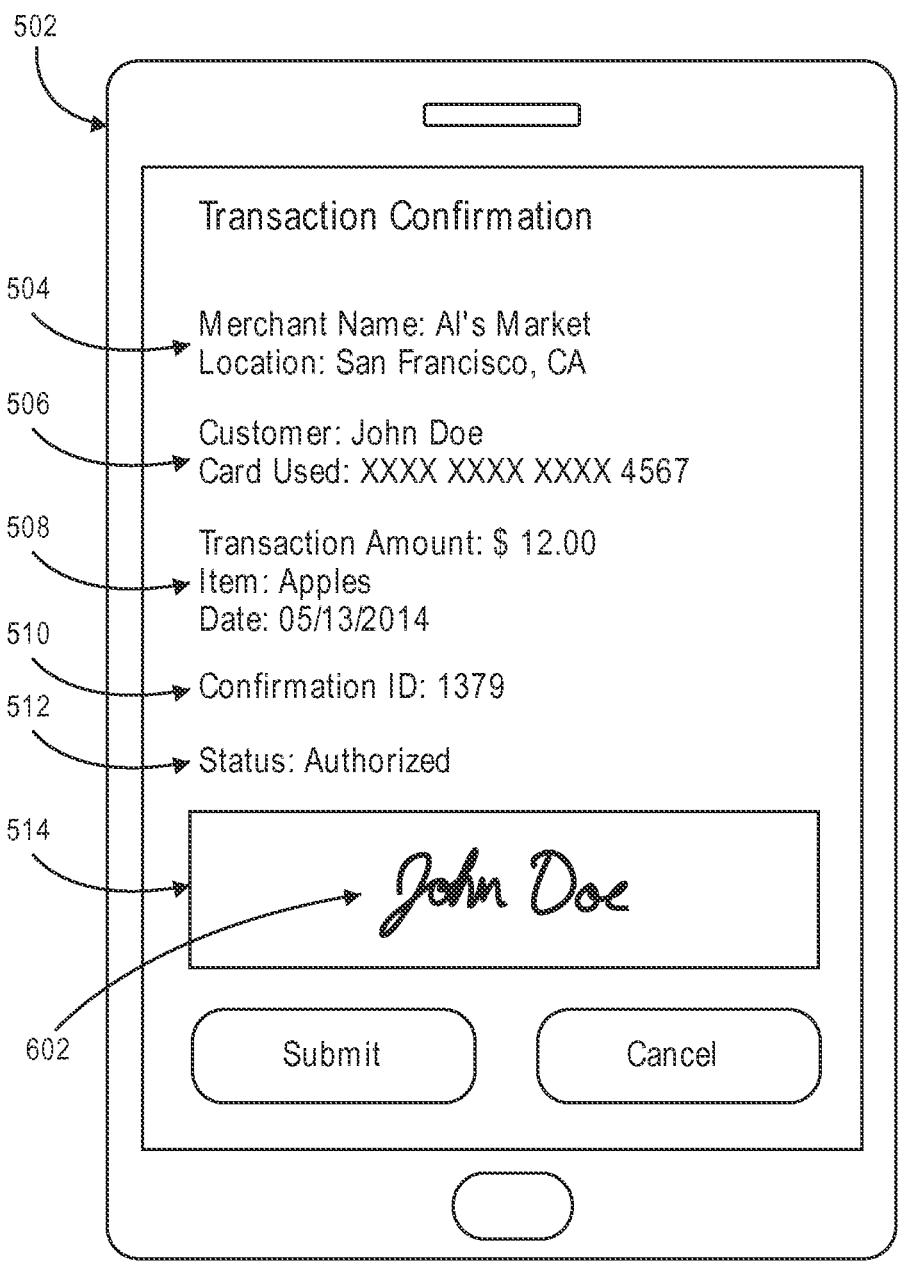
FIG. 6 shows a mobile device displaying exemplary confirmation element data and a user personal identifier according to embodiments of the invention.

FIG. 5 and FIG. 6 show exemplary confirmation element data displayed on a mobile device 502 for a financial transaction. FIG. 5 shows mobile device 502 displaying exemplary confirmation element data according to embodiments of the invention. FIG. 6 shows mobile device 502 displaying exemplary confirmation element data and a user personal identifier 602 entered by a user according to embodiments of the invention.

The exemplary confirmation element data may be displayed on a display of mobile device 502. The exemplary confirmation element data may include resource providing entity data 504, user data 506, transaction details 508, a confirmation element identifier 510, an authorization status 512, and a user personal identifier input element 514. In some embodiments, mobile device 502 may have similar features to those described for mobile devices in other figures described herein. A user, such as user 101 of FIG. 1, may be operating mobile device 502 to conduct the transaction.

Resource providing entity data 504 may be any information surrounding an entity making available a resource to the user. For example, resource providing entity data 504 may include a name, or a location of an associated resource providing entity. In some embodiments, the resource providing entity may be a merchant that provides goods to the user. In some cases, resource providing entity data 504 may include further information, such as an address, a logo, contact information, and other information. In some embodiments, at least some of resource providing entity data 504 included in the confirmation element data may not be displayed on mobile device 502.

User data 506 may be any information surrounding the user conducting the transaction associated with the confirmation element data. For example, user data 506 may include a name and an account utilized for the transaction associated with the user. In some embodiments, user data 506 may further include contact information, account details, and other relevant information. In some embodiments, a partial account number (e.g., last four digits) may be made visible in the displayed confirmation element data. In some embodiments, at least some of user data 506 included in the confirmation element data may not be displayed on mobile device 502.

Transaction details 508 may be any information regarding the transaction associated with the displayed confirmation element data. For example, transaction details 508 may include a transaction amount, items purchased, and a transaction date. In some embodiments, some of transaction details 508 included in the confirmation element data may not be displayed on mobile device 502.

Confirmation element identifier 510 may uniquely identify the confirmation element data for the transaction. Confirmation element identifier 510 may uniquely identify the transaction associated with the confirmation element data. While confirmation element identifier 510 is shown as a four-digit number in FIG. 5 and FIG. 6, embodiments are not so limited. For example, confirmation element identifier 510 may include any number of characters and may be alphanumeric. In some embodiments, confirmation element identifier 510 may not be displayed on mobile device 502. However, the confirmation element data may still include confirmation element identifier 510 to enable its association with an authorization response message.

Authorization status 512 may be an indicator of an authorization decision made by an authorization computer (e.g., issuer computer) associated with the transaction. For example, if the transaction is authorized, a status including the text "authorized" may be displayed on mobile device 502. Any other suitable text may be displayed, such as "approved." If the transaction is not authorized, the status may include any suitable indication, such as the text "not authorized" or "declined." In some cases, authorization status 512 may not be displayed on mobile device 502.

User personal identifier input element 514 may enable the user to provide a user personal identifier to mobile device 502. User personal identifier input element 514 may detect the user personal identifier entered by the user and enable mobile device 502 to generate modified confirmation element data comprising the user personal identifier. For example, user personal identifier input element 514 may be part of a user interface display of a touch screen of mobile device 502 on which the user may manually sign their name. In other embodiments, user personal identifier input element 514 may be implemented in other ways, such as a biometric reader enabled by a combination of hardware and software of mobile device 502. In some cases, the user may be able to choose amongst a plurality of user personal identifier input elements to enter the user personal identifier.

In embodiments of FIG. 5 and FIG. 6, the confirmation element data displayed shows information surrounding a purchase made by the user at a merchant. For example, based on resource providing entity data 504, the merchant is "Al's Market" and is located in San Francisco. Based on user data 506, the user is be a customer named "John Doe" and utilized an account associated with a card ending with the four digits, "4567," to pay for the purchase. Based on transaction details 508, the user paid 12 dollars for apples on May 13, 2014. Confirmation element identifier 510 for the transaction is "1379," and the transaction was authorized by an authorization computer, indicated by authorization status 512 including the text "Authorized."

After mobile device 502 receives the confirmation element data as displayed in mobile device 502 of FIG. 5, the user may enter user personal identifier 602 as shown in mobile device 502 of FIG. 6. For example, user personal identifier 602 may be an electronic signature. The user may manually sign their name, "John Doe," using user personal identifier input element 514, which may be a user interface display of a touch screen of mobile device 502. A stylus or finger may be used to create the signature.

The user may then accept the confirmation element data by submitting the entered user personal identifier 602. In some embodiments, the user may press a "Submit" button enabled by the user interface display to submit the confirmation element data. In some embodiments, the user may press a "Cancel" button to re-enter a user personal identifier. Submission of user personal identifier 602 by the user may indicate an acknowledgement of the received confirmation element data. Mobile device 502 may utilize user personal identifier 602 and the confirmation element data to generate modified confirmation element data to send to another entity, such as a payment processing network. In some embodiments, modified confirmation element data may be converted at the payment processing network and included in an authorization response message associated with the modified confirmation element data, as shown in FIG. 9.

Figure 7:
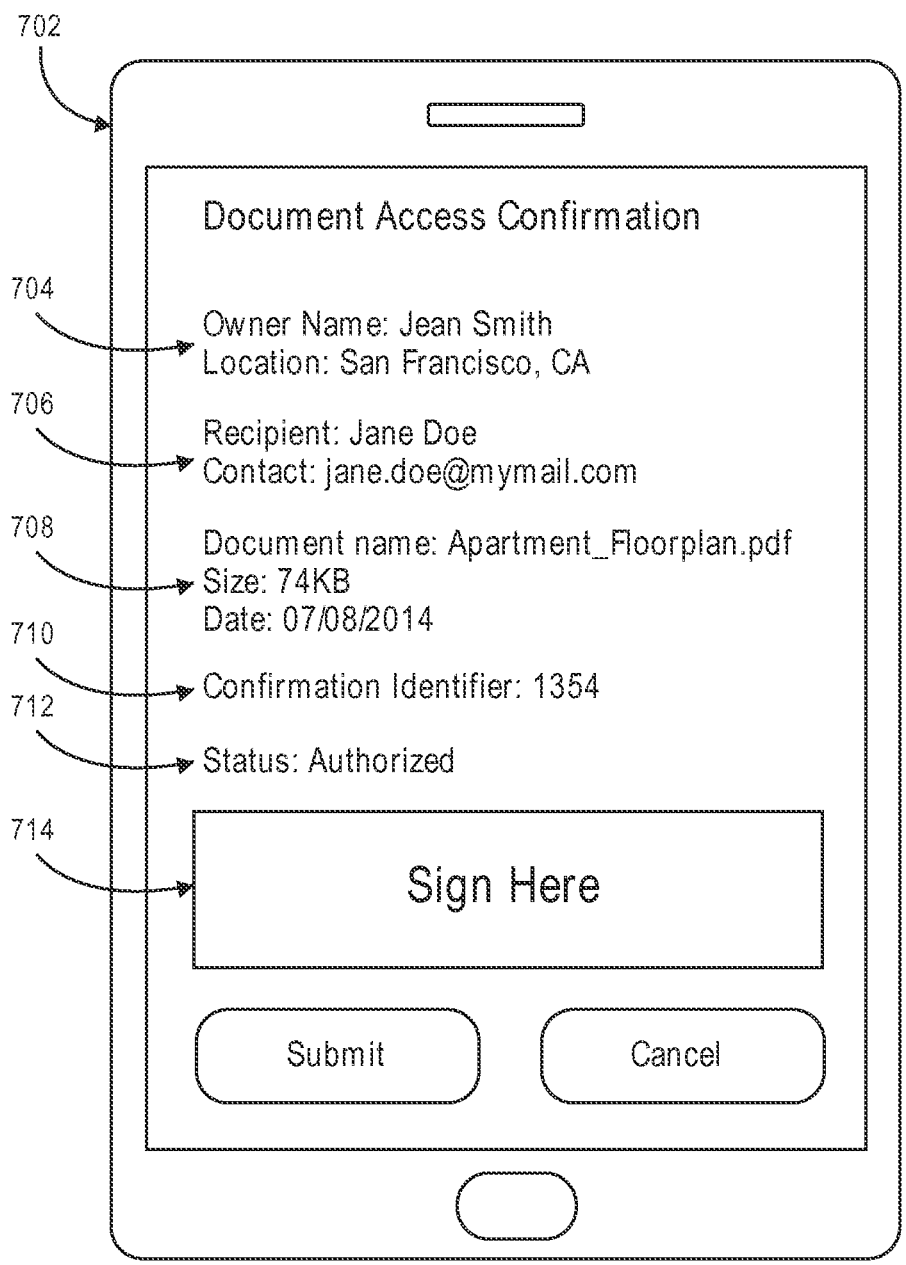
FIG. 7 shows a mobile device displaying exemplary confirmation element data according to embodiments of the invention.
Figure 8:
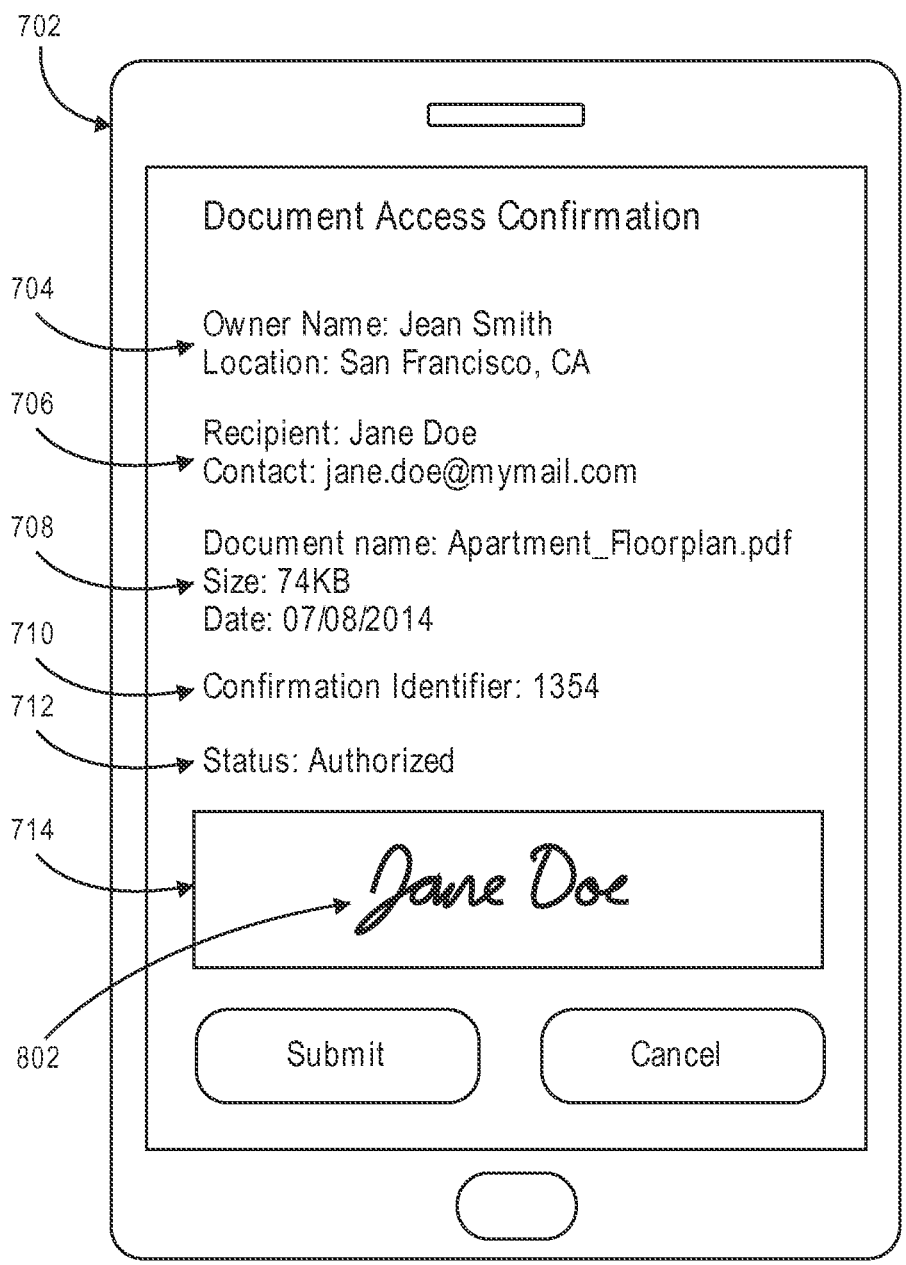
FIG. 8 shows a mobile device displaying exemplary confirmation element data and a user personal identifier according to embodiments of the invention.

In some embodiments, confirmation element data may be associated with a non-financial transaction. FIG. 7 and FIG. 8 show exemplary confirmation element data displayed on a mobile device 702 for a transaction enabling document access for a user. FIG. 7 shows mobile device 702 displaying exemplary confirmation element data according to embodiments of the invention. FIG. 8 shows mobile device 702 displaying exemplary confirmation element data and a user personal identifier 802 entered by the user according to embodiments of the invention.

The exemplary confirmation element data may be displayed on a display of mobile device 702. The exemplary confirmation element data may include resource providing entity data 704, user data 706, transaction details 708, a confirmation element identifier 710, an authorization status 712, and a user personal identifier input element 714. In some embodiments, mobile device 702 may have similar features to those described for mobile devices in other figures described herein. A user, such as user 101 of FIG. 1, may be operating mobile device 702 to conduct the transaction.

Resource providing entity data 704 may be any information surrounding an entity making available a resource to the user. For example, resource providing entity data 704 may include a name and a location associated with a resource providing entity. In some embodiments, the resource providing entity may be a document owner that provides the user access to a document. In some cases, resource providing entity data 704 may include further information, such as an address, a logo, contact information, and other information. In some embodiments, at least some of resource providing entity data 704 included in the confirmation element data may not be displayed on mobile device 702.

User data 706 may be any information surrounding the user conducting the transaction associated with the confirmation element data. For example, user data 706 may include a name and an email address that can be utilized to provide the user access to the document. In some embodiments, user data 706 may further include other contact information (e.g., phone number, additional email addresses, address, etc.), and other relevant information surrounding the user. In some embodiments, at least some of user data 706 included in the confirmation element data may not be displayed on mobile device 702.

Transaction details 708 may be any information regarding the transaction associated with the displayed confirmation element data. For example, transaction details 708 may include a name and a size of the document to which the user received access, as well as the date that the transaction occurred. In some embodiments, at least some of transaction details 708 included in the confirmation element data may not be displayed on mobile device 702.

Confirmation element identifier 710 may uniquely identify the confirmation element data for the transaction. While confirmation element identifier 710 is shown as a four-digit number in FIG. 7 and FIG. 8, embodiments are not so limited. For example, confirmation element identifier 510 may include any number or characters and may be alphanumeric. In some embodiments, confirmation element identifier 710 may not be displayed on mobile device 702. However, the confirmation element data may still include confirmation element identifier 710 to enable its association with an authorization request message.

Authorization status 712 may be an indicator of an authorization decision made by an authorization computer (e.g., issuer computer) associated with the transaction. For example, if the transaction is authorized, a status including the text, "authorized," may be displayed on mobile device 702. Any other suitable text may be displayed, such as "approved." If the transaction is not authorized, the status may include any suitable indication, such as the text "not authorized" or "declined." In some cases, authorization status 712 may not be displayed on mobile device 702.

User personal identifier input element 714 may enable the user to enter a user personal identifier to mobile device 702. User personal identifier input element 714 may detect the user personal identifier entered by the user and enable mobile device 702 to generate modified confirmation element data comprising the user personal identifier. For example, user personal identifier input element 714 may be part of a user interface display of a touch screen of mobile device 702 on which the user may manually sign their name. In other embodiments, user personal identifier input element 714 may be implemented in other ways, such as a biometric reader enabled by a combination of hardware and software of mobile device 702. In some cases, the user may be able to choose amongst a plurality of user personal identifier input elements to enter the user personal identifier.

In embodiments of FIG. 7 and FIG. 8, the confirmation element data displayed shows information surrounding document access provided by a document owner to the user. For example, based on resource providing entity data 704, the document owner is "Jean Smith" and is located in San Francisco. Based on user data 706, the user is a recipient named "Jane Doe" and received access to the document by an email address, "jane.doe@mymail.com." Based on transaction details 708, the user received access to a document named "Apartment_Floorplan.pdf" of size 74 KB on Jul. 8, 2014. Confirmation element identifier 710 for the transaction is "1354" and the document access was authorized by an authorization computer, indicated by authorization status 712 including the text "Authorized."

After mobile device 702 receives the confirmation element data as displayed in mobile device 702 of FIG. 7, the user may enter user personal identifier 802 as shown in mobile device 702 of FIG. 8. For example, user personal identifier 802 may be an electronic signature. The user may manually sign their name, "Jane Doe," using user personal identifier input element 714, which may be a user interface display of a touch screen of mobile device 702.

The user may then accept the confirmation element data by submitting the entered user personal identifier 802. In some embodiments, the user may press a "Submit" button enabled by the user interface display to submit the confirmation element data. In some embodiments, the user may press a "Cancel" button to re-enter a user personal identifier. Submission of user personal identifier 802 by the user may indicate an acknowledgement of the received confirmation element data. Mobile device 702 may utilize user personal identifier 802 and the confirmation element data to generate modified confirmation element data.

FIG. 9 shows a data format for an exemplary authorization response message 900 to be sent to an access device according to embodiments of the invention. Authorization response message 900 may include a personal account number (PAN) 902, an expiration date 904, a service code 906, a confirmation element identifier 908, a card verification value (CVV) 910, converted modified confirmation element data 912, an authorization status 914, and additional data 916. In some embodiments, these elements of authorization response message 900 may be stored in unique fields. Additional data 916 may be additional discretionary data that may be included in authorization response message 900 that may be useful for processing.

Personal account number (PAN) 902 may be an account identifier. PAN 902 may typically be 16 digits and may identify an account utilized in a transaction. For example, PAN 902 may be associated with a payment device, such as a card, utilized for the transaction by the user.

Expiration date 904 may be a date at which the account utilized for the transaction may become invalid. In some cases, expiration date 904 may comprise a month and year and may typically be 4 digits.

Service code 906 may comprise information regarding transaction processing. For example, service code 906 may indicate information about interchange rules, authorization processing, and range of services. Service code 906 may typically be three digits.

Confirmation element identifier 908 may be an indicator that uniquely identifies confirmation element data. In some cases, confirmation element identifier 908 may include any number of characters and may be alphanumeric. As described above, confirmation element identifier 908 may associate authorization response message 900 of a transaction with confirmation element data corresponding to the transaction. This may ensure modified confirmation element data may also be associated with the confirmation element identifier (e.g., since modified confirmation element data may be confirmation element data in addition to a user personal identifier) and the authorization response message 900. Confirmation element identifier 908 may be a variable number of digits depending on the entity generating confirmation element identifier 908.

Card verification value 910 may be a security code. For example, card verification value 910 may be utilized as a security feature for card not present transactions, where card verification value 910 may be manually entered during a transaction. Typically, card verification value 910 may be three or four digits.

Converted modified confirmation element data 912 may be modified confirmation element data that is converted to conform to standards of authorization response message 900. For example, modified confirmation element data may be converted to have one or more of a certain size, length, format, message type, or other features to enable inclusion in authorization response message 900. As shown, converted modified confirmation element data 912 may be included as a field in authorization response message 900. In some embodiments, converted modified confirmation element data 912 may be part of additional data 916. Converted modified confirmation element data 912 may be a variable number of digits.

Authorization status 914 may be an indicator of an authorization decision made for the transaction associated with authorization response message. Typically, authorization status 914 may be a flag (e.g., 1 for approved, 0 for declined) that may be one digit.

II. Technical Advantages

Embodiments of the invention may provide a number of advantages. For example, by having confirmation element data generated by a payment processing network on behalf of a merchant, the payment processing network can define a standard or uniform format for confirmation element data that may be sent to a mobile device. Further, this can also reduce the amount of resources that each merchant may establish for confirmation element data processing. For example, rather than each merchant having infrastructure to generate confirmation element data, all processing may be handled by the payment processing network.

Embodiments of the invention may also forgo the need for a merchant to provide physical copies of confirmation element data. Typically, a user may have to physically sign a physical copy of confirmation element data during a transaction to confirm acknowledgement of the transaction. However, in embodiments of the invention, the merchant may electronically receive confirmation element data (e.g., by an access device) without compromising user confirmation. For example, the merchant may receive modified confirmation element data including a user personal identifier, indicating the user's acknowledgement of the confirmation element data, with an authorization response message for the transaction.

Embodiments of the invention may also increase security associated with the transaction by limiting information that may be provided to or stored by a merchant. Rather than providing a user's contact information (e.g., phone number and/or email address) to the merchant via the access device, the payment processing network can retrieve data it has already stored from pre-existing user profiles (e.g., received via an enrollment). In other embodiments, the user may not need to provide any enrollment information as the payment processing network may retrieve the user's contact information directly from an authorization computer (e.g., issuer computer) associated with the user. Embodiments of the invention may not require the user to provide these details to the merchant during the transaction.

III. Exemplary Computer System

Figure 10:
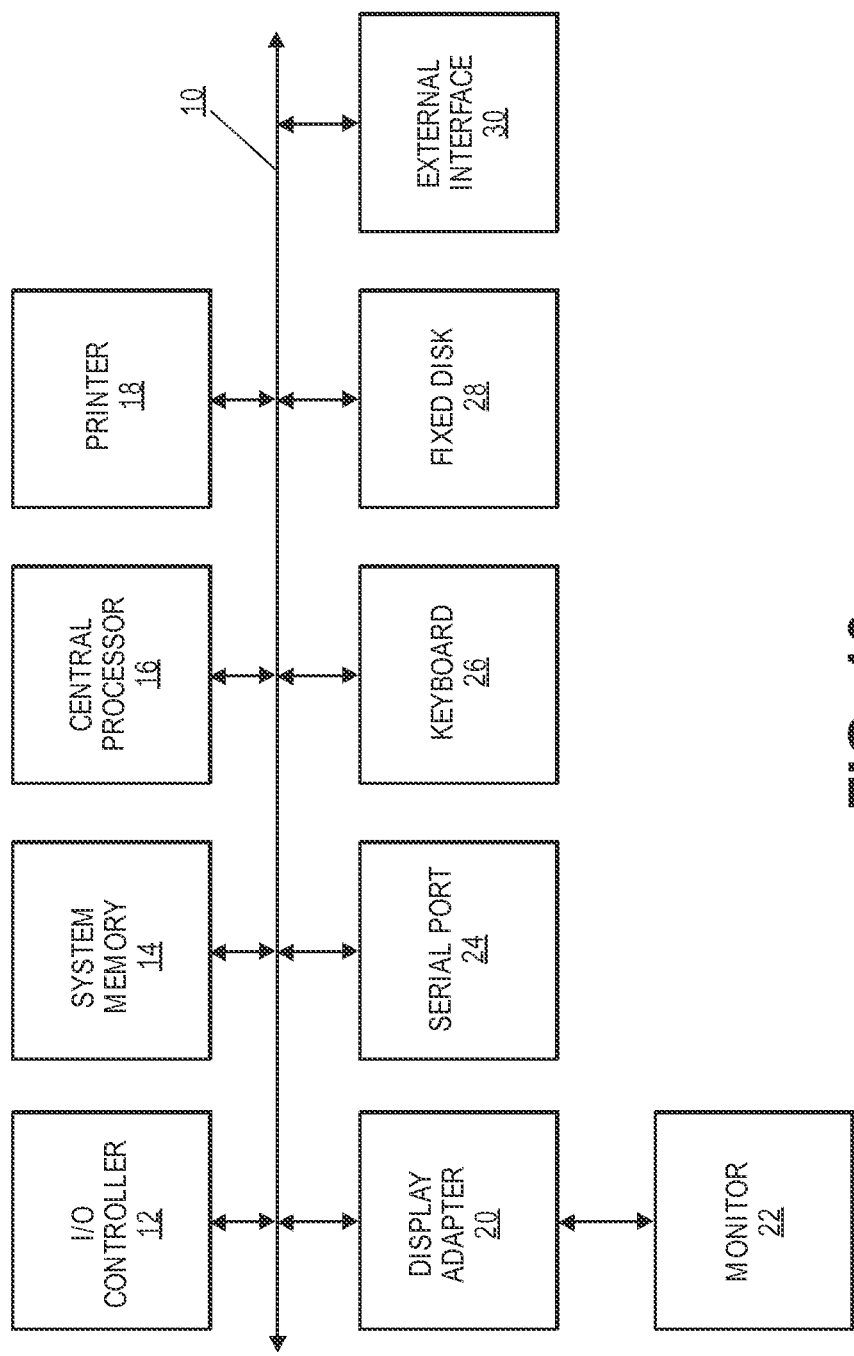
FIG. 10 is a block diagram for an exemplary computer system.

FIG. 10 is a high level block diagram of a computer system that may be used to implement any of the entities or components described above. The subsystems shown in FIG. 10 are interconnected via a system bus 10. Additional subsystems such as a printer 18, keyboard 26, fixed disk 28 (or other memory comprising computer readable media), monitor 22, which is coupled to display adapter 20, and others are shown. Peripherals and input/output (I/O) devices, which couple to I/O controller 12 (which can be a processor or other suitable controller), can be connected to the computer system by any number of means known in the art, such as serial port 24. For example, serial port 24 or external interface 30 can be used to connect the computer apparatus to a wide area network such as the Internet, a mouse input device, or a scanner. The interconnection via system bus allows the central processor 16 to communicate with each subsystem and to control the execution of instructions from system memory 14 or the fixed disk 28, as well as the exchange of information between subsystems. The system memory 14 and/or the fixed disk 28 may embody a computer readable medium. In some embodiments, the monitor 22 may be a touch sensitive display screen.

A computer system can include a plurality of the same components or subsystems, e.g., connected together by external interface 30 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer, an authorization request message for a transaction by a user from an access device;
   sending, by the server computer, the authorization request message to an authorization computer;
   receiving, by the server computer, an authorization response message from the authorization computer indicating authorization of the transaction;
   upon determining that the authorization of the transaction has been approved, determining, by the server computer, contact information for the user;
   generating, by the server computer, confirmation element data including transaction data associated with the transaction and a confirmation element identifier;
   associating, by the server computer, the confirmation element data and the authorization response message by the confirmation element identifier;
   sending, by the server computer, the confirmation element data and the confirmation element identifier to a mobile device associated with the user via the contact information;
   receiving, by the server computer, modified confirmation element data from the mobile device, wherein the modified confirmation element data comprises an electronic signature appended to the confirmation element data by the mobile device upon receiving confirmation of the transaction by the user;
   determining, by the server computer, the authorization response message associated with the modified confirmation element data by the confirmation element identifier;
   converting, by the server computer, the modified confirmation element data into a standard format;
   generating, by a confirmation element data conversion submodule of the server computer, a modified authorization response message which includes the modified confirmation element data in the standard format; and
   sending, by the server computer, the authorization response message including the modified confirmation element data to the access device, wherein the access device is caused to access the modified confirmation element data in the standard format and wherein the transaction is completed based on the authorization response message.

2. The method of claim 1, wherein the modified confirmation element data is converted to fit a standard of the authorization response message.

3. The method of claim 1, wherein the confirmation element identifier is sent as part of the confirmation element data to the mobile device.

4. The method of claim 3, wherein associating the confirmation element data and the authorization response message comprises including the confirmation element identifier in the authorization response message.

5. The method of claim 4, wherein determining the authorization response message associated with the modified confirmation element data comprises:
retrieving, by the server computer, the confirmation element identifier from the modified confirmation element data; and
determining, by the server computer, that the authorization response message includes the confirmation element identifier.

6. The method of claim 1, wherein the modified confirmation element data is received in response to the user entering the user personal identifier into the mobile device.

7. The method of claim 5, wherein the user personal identifier is an electronic signature of the user.

8. The method of claim 6, wherein the user personal identifier is a biometric identifier of the user.

9. The method of claim 1, wherein the confirmation element data includes transaction data for the transaction conducted with a resource providing entity.

10. The method of claim 9, wherein the resource providing entity is a merchant.

11. The method of claim 9, wherein the resource providing entity is a resource owner that enables the user to access a resource.

12. A server computer comprising:
a processor; and
a computer-readable medium coupled to the processor, the computer-readable medium comprising code, executable by the processor, for performing a method comprising
receiving an authorization request message for a transaction by a user from an access device,
sending the authorization request message to an authorization computer,
receiving an authorization response message from the authorization computer indicating authorization of the transaction,
upon determining that the authorization of the transaction has been approved, determining contact information for the user,
generating confirmation element data including transaction data associated with the transaction and a confirmation element identifier,
associating, by the server computer, the confirmation element data and the authorization response message by the confirmation element identifier,
sending the confirmation element data and the confirmation element identifier to a mobile device associated with the user via the contact information,
receiving modified confirmation element data from the mobile device, wherein the modified confirmation element data comprises an electronic signature appended to the confirmation element data by the mobile device upon receiving confirmation of the transaction by the user,
converting, by the server computer, the modified confirmation element data into a standard format,
determining the authorization response message associated with the modified confirmation element data by the confirmation element identifier,
modifying, by a confirmation element data conversion submodule, the authorization response message to include the modified confirmation element data in the standard format, and
sending the authorization response message including the modified conformation element data to the access device, wherein the access device is caused to access the modified confirmation element data in the standard format and wherein the transaction is completed based on the authorization response message.

13. A method comprising:
receiving, by an access device, user data for a transaction conducted by a user from a mobile device associated with the user;
generating, by the access device, an authorization request message;
sending, by the access device, the authorization request message to a server computer, which causes the server computer to modify an authorization response message to include modified conformation element data; and
receiving, by the access device, the authorization response message comprising the modified confirmation element data associated by a confirmation element identifier, the modified confirmation element data having been converted into a standard format by the server computer, wherein the modified confirmation element data comprises an electronic signature appended to the modified confirmation element data by the mobile device upon receiving confirmation of the transaction by the user;
accessing and presenting the modified confirmation element data in the standard format; and
completing the transaction based on the authorization response message.

14. The method of claim 13, wherein the confirmation element identifier is included in the authorization response message and the modified confirmation element data.

15. The method of claim 13, wherein the modified confirmation element data is included in the received authorization response message.

16. The method of claim 14, wherein the modified confirmation element data is converted to fit a standard of the authorization response message.

17. A method comprising:
sending, by a mobile device, user data for a transaction conducted by a user to an access device;
receiving, by the mobile device, confirmation element data and a confirmation element identifier associated with the confirmation element data;
receiving, by the mobile device, a user personal identifier from the user;
generating, by the mobile device, modified confirmation element data comprising the user personal identifier appended to the confirmation element data upon receiving the user personal identifier by the user; and
sending, by the mobile device, the modified confirmation element data comprising the user personal identifier to a server computer, thereby causing the server computer to convert the modified confirmation element data into a standard format, generate an authorization response message including the modified confirmation element data in the standard format, and send the authorization response message to the access device, which is caused to access the modified confirmation element data in the standard format.

18. The method of claim 17, wherein the confirmation element identifier is received as part of the confirmation element data.

19. The method of claim 1, wherein the access device comprises a POS terminal, the confirmation element data comprises an electronic transaction record, the modified confirmation element data comprises an electronic transaction record with the personal identifier appended to it, and the personal identifier comprises an electronic signature of the user.

\* \* \* \* \*